2,812,336
Patented Nov. 5, 1957

United States Patent Office

2,812,336

PURIFICATION OF 24-HYDROXY-24,24-DIARYL SUBSTITUTED-STEROID COMPOUNDS

Emil Kaiser, Chicago, and Lorraine Sporar, Joliet, Ill., assignors to Armour and Company, Chicago, Ill., a corporation of Illinois No Drawing. Application November 22, 1954,
Serial No. 470,519

3 Claims. (Cl. 260—397.5)

This invention relates to the purification of carbinol derivatives which are useful intermediates in the synthesis of progesterone and other valuable substances. More particularly, this invention relates to the purification of steroidal carbinols which are characterized by the presence of a hydroxy and two aryl substituents in the 24-position such as 3,6,24-trihydroxy-24,24-diphenylcholane.

For example, in the synthesis of progesterone from a starting material such as hyodesoxycholic acid, it is highly desirable to proceed through a sequence of steps involving conversion of the acid to the corresponding ester, preferably methyl hyodesoxycholate. The ester is then reacted with a sufficient amount of an aryl magnesium halide such as phenylmagnesium bromide to form the diaryl substituted carbinol intermediate which is used in the subsequent steps of the synthesis leading to the preparation of progesterone and related pharmaceutical products.

As various stages of the total synthesis it is necessary or desirable to purify the intermediate compounds before proceeding with the next step of the procedure. Various purification procedures for the specific types of steroid intermediates encountered in the process are well known by those skilled in the art. Such procedures usually result in the loss of appreciable amounts of the specific compound or intermediate being purified, the overall losses being cumulative with respect to the yield of final product.

It is accordingly highly desirable to eliminate as many purification steps as possible without impairing the yield and quality of the end product. It is also highly desirable to obtain the required degree of purification at any given step with minimum loss of a given intermediate compound.

We have now found that when the 24,24 diaryl-24-hydroxy intermediate or carbinol derivative is subjected to crystallization from methyl ethyl ketone, the recovery of the crystallized product is substantially quantitative. At the same time, the degree of purification which is achieved is sufficient to permit the omission of a subsequent purification step heretofore required in the following step of the synthesis involving the preparation of the diene derivative hereinafter described in detail.

It is accordingly an object of this invention to provide a process for purifying steroidal carbinols having a hydroxy and two aryl substituents in the 24-position. It is another object of this invention to provide a simple and effective process for purifying steroidal carbinols having a hydroxy and two aryl substituents in the 24-position whereby the yield of purified carbinol is substantially quantitative. Other objects and advantages will be apparent as this specification proceeds.

The purification of the intermediate carbinol 3,6,24-trihydroxy-24,24-diphenylcholane is set forth as illustrative of the purification procedure of our invention. This specific carbinol is a highly desirable compound in the preparation of $\Delta^{20,23}$-3,6-diacetoxy-24,24-diphenylcholadiene which is obtained by the simultaneous dehydration of the 24-hydroxy group and conversion of the 3,6-dihydroxy substituents to acetoxy groups; the ethylene derivative is next selectively brominated in the 22-position to yield the bromo compound, $\Delta^{23}$-3,6-diacetoxy-22-bromo-24,24-diphenylcholene which is then dehydrohalogenated to form the conjugated diene compound.

The purity of the diene compound, $\Delta^{20,23}$-3,6-diacetoxy-24,24-diphenylcholadiene is a matter of great importance in so far as proceeding with the next step of the synthesis is concerned. The desired purity level can be achieved by crystallization of the diene from acetone; however, losses ranging from at least 10 to over 20% of product are encountered.

Previous attempts to purify the carbinol have not been proven very satisfactory. After washing the crude carbinol with acetone, for example, a product is obtained which exhibits softening at 127 to 130° C. and melts at 197 to 200° C. Crystallizing the carbinol from various solvents such as acetone, benzene, etc., causes slight increase in purity as evidenced by elevation of melting point to 200 to 202° C. The recovery of the carbinol however is only about 80%. The losses are even greater when conventional purification procedures such as steam distillation or charcoal adsorption, etc. are used for improving the purity of the carbinol. Because of these factors, it has been the practice to forego extensive purification of the carbinol in favor of the subsequent purification of the diene compound previously mentioned which likewise involves substantial yield losses.

The use of methyl ethyl ketone in accordance with the process of the present invention vastly improves the extent of purification achieved by means of a single crystallization step. Approximately 95% of the initial carbinol can be recovered from the mother liquor and the melting point of the product after a single crystallization is raised to 210 to 213° C. An additional 3 to 4% recovery can be made from the mother liquor thereby accounting for substantially all of the original carbinol in a vastly improved state of purity. That such a result may be obtained through the use of methyl ethyl ketone is unexpected and could not have been predicted.

The enhanced purity of the carbinol intermediate is readily seen from a comparison of the extinction coefficient, $$E^{1\%}_{1\,cm.}$$

observed at a characteristic wave-length of 306 millimicrons for a 1% solution of the diene compound prepared from the carbinol. In the case of the carbinol purified by crystallization from benzene, the $$E^{1\%}_{1\,cm.}$$

value is 365. During the crystallization of the carbinol, however, a loss of nearly 20% in yield is encountered in the recovery of the crystallized product. Further, the degree of purity attained is not sufficient to make the next step in the synthesis feasible without further purification of the diene compound. On the other hand, the $$E^{1\%}_{1\,cm.}$$

of the conjugated diacetoxy diene compound prepared from the carbinol crystallized from methyl ethyl ketone with an overall loss in yield of only 2% is 385 at 306 mu. Thus, it is seen that not only is a significant increase in purity derived as an advantage but a very important saving in yield of approximately 18% is also realized as compared to the results achieved through the use of benzene as the crystallization solvent.

In practicing the process of this invention, the crude carbinol is dissolved in methyl ethyl ketone which is preferably heated to below its boiling point to facilitate dissolution of the solute therein. Upon cooling the solution, the carbinol crystallizes and can be readily separated as by centrifugation, filtration or decantation.

In order to minimize the solubility of the carbinol in the mother liquor and thereby enhance the recovery of crystalline product from the solvent, it is preferred to add a quantity of water to the ketone sufficient to saturate the same. Approximately 10% by weight of water is adequate for this purpose although slightly more or less quantities of water can be used in the process with good results. If the crude carbinol from a plant process is used without first drying the material, the amount of water carried over with the moist carbinol is generally sufficient for saturating the ketone.

The ratio of saturated solvent to solute for crystallizing the carbinol can be varied considerably as from 5 to 15 volumes of solvent mixture per unit weight of the crude carbinol. It is preferred, however, to use quantities having volume–weight ratios of from 8 to 12 volumes per unit weight of solute. Best results are obtained when 10 volumes of the saturated solvent containing 10% by weight of water are used per unit weight of the carbinol with respect to the maximum yield (about 95%) of purified carbinol from the initial crop of crystals. The residual carbinol in the mother liquor can be recovered by concentrating the solvent or further cooling.

If desired, the solvent can be used repeatedly on further batches of the carbinol without any significant impairment of efficiency provided the water content is not made unduly excessive. It may accordingly be necessary to add additional ketone to the mixture to restore the approximate 90:10 ratio found to be most desirable for the process.

Following separation of the crystallized carbinol from the solvent mixture, it may be dried, if desired, and the material is then ready for use in the subsequent step of the synthesis.

The following examples are illustrative of the process herein set forth:

*Example I*

A 20 gram portion of crude dried carbinol obtained by reacting phenylmagnesium bromide and methyl hyodesoxycholate followed by acid hydrolysis of the complex was dissolved by heating in 200 ml. mixture of methylethyl ketones saturated with water. Upon cooling, the crystalline product which was formed was separated by filtration. The yield of dried crystalline product was 18.8 g. amounting to 94% recovery. It melted at 211 to 213° C.

*Example II*

A kilogram of 3,6,24-trihydroxy-24,24-diphenylcarbinol obtained by reacting methyl hyodesoxycholate with two moles of phenylmagnesium chloride is dissolved in a mixture containing 9 liters of methyl ethyl ketone and 1 liter of water. The carbinol is completely solubilized by heating the solvent mixture to 60° C. and is clarified by filtration of the warmed solution. Upon cooling, the carbinol crystallizes and is separated by filtration and dried. The yield of dried product is 948 g. having a melting point, 210 to 213° C.

Other carbinols having the diaryl and hydroxy substituents in the 24-position of the steroid molecule can also be used in accordance with the process of this invention.

While in the foregoing specification this invention has been described in relation to a preferred embodiment thereof and specific details of this embodiment have been set forth for the purpose of illustration, it will be apparent to those skilled in the art that this invention is susceptible to other embodiments and that many of the details herein set forth can be varied considerably without departing from the basic concept of the invention.

We claim:

1. A process for purifying 3,6,24-trihydroxy-24,24-diphenylcholane comprising the steps of dissolving the solid in a mixture of methyl ethyl ketone saturated with water, cooling the solution to crystallize the solute, and separating the crystallized product from the solvent.

2. A process for purifying 3,6,24-trihydroxy-24,24-diphenylcholane comprising the steps of dissolving a unit weight of the steroid in from 5 to 15 volumes of methyl ethyl ketone saturated with water, cooling the mixture to crystallize said steroid, and separating the crystallized product from the solvent.

3. A process for purifying 3,6,24-trihydroxy-24,24-diphenylcholane comprising the steps of adding a unit weight of the steroid carbinol to about 10 unit volumes of an aqueous solvent mixture containing about 90% by volume of methyl ethyl ketone, warming the mixture to completely solubilize said carbinol, cooling the mixture to crystallize the solubilized carbinol, and separating the crystallized product from the solvent.

References Cited in the file of this patent

UNITED STATES PATENTS 2,263,785     Reichstein _____ Nov. 25, 1941

FOREIGN PATENTS 203,131     Switzerland _____ June 1, 1939